UNITED STATES PATENT OFFICE.

JOHN W. HORNSEY, OF SUMMIT, NEW JERSEY, ASSIGNOR TO GENERAL REDUCTION GAS AND BY-PRODUCTS COMPANY, A CORPORATION OF DELAWARE.

PROCESS OF OBTAINING POTASSIUM CHLORID FROM BRINES.

1,288,592.  Specification of Letters Patent.  Patented Dec. 24, 1918.

No Drawing.  Application filed April 17, 1915.  Serial No. 22,106.

*To all whom it may concern:*

Be it known that I, JOHN W. HORNSEY, a citizen of the United States, and a resident of Summit, Union county, New Jersey, have invented certain new and useful Improvements in Processes of Obtaining Potassium Chlorid from Brines, of which the following is a specification.

My invention relates to the manufacture of potassium chlorid from the waters of alkaline lakes and springs, such as exist mostly in the arid regions of the West and also from various saline deposits, the salts of which are readily dissolved in water to form solutions resembling those which constitute the waters of such alkaline lakes and springs.

In addition to potassium chlorid (KCl) such waters contain other salts, such as sodium chlorid (NaCl), sodium sulfate ($Na_2SO_4$), sodium monocarbonate ($Na_2CO_3$), sodium bicarbonate ($NaHCO_3$) and sodium tetraborate ($Na_2B_4O_7$), from which it is necessary to separate the potassium chlorid in order to make it available for commercial use, and the object of my invention is to effect such separation and particularly to eliminate the sodium carbonates, the alkalinity of which renders potassium chlorid unfit for use as a fertilizer and other purposes, and permit the potassium chlorid to be recovered in marketable form; and in the mode of treatment which I shall hereinafter describe.

The following is a typical manner of carrying out my invention with a brine of approximately the following composition:

| | |
|---|---|
| Borax ($Na_2B_4O_7$) | 1.55 |
| Sodium bicarbonate ($NaHCO_3$) | .25 |
| Sodium monocarbonate ($NO_2CO_3$) | 4.76 |
| Sodium chlorid (NaCl) | 15.84 |
| Sodium sulfate ($Na_2SO_4$) | 6.72 |
| Potassium chlorid (KCl) | 4.36 |
| Comprising a total of | 33.48% |

I first proceed to eliminate the sodium monocarbonate by bringing the solution into intimate contact with carbon dioxid in a suitable container. The sodium monocarbonate is transformed by the action of the carbon dioxid into sodium bicarbonate, which, being comparatively insoluble in the solution, particularly in the presence of the other salts, is thrown down as a precipitate and may be removed by filtering or other suitable means. I may, if I desire, repeat this step at a further stage of the process, because it is not always desirable or practical to remove all of the sodium monocarbonate at one operation, though the greatest portion (say 90%) should be eliminated by this operation.

Having removed or greatly reduced the quantity of sodium monocarbonate, I next evaporate a sufficient amount of water from the brine to bring about the crystallization of the particular salt which next tends to come out of the solution. This in the instance stated above is sodium chlorid, and is separated from the brine by filtration or in any suitable fashion. This step is preferably continued until a point is reached when the potassium chlorid and borax begin to precipitate with the sodium chlorid. The filtrate is next cooled, which brings about the precipitation of a considerable percentage of potassium chlorid mixed with borax and smaller percentages of the other salts. This precipitate is separated from the brine and is redissolved in hot water to form a dilute solution, and is placed to one side to be treated, as will subsequently be described. A sufficient amount of water is now evaporated from the filtrate of the cooling step to bring about the crystallization of the next salt which tends to separate out. This consists essentially of sodium sulfate mixed with sodium chlorid which is removed from the brine by filtration or in any suitable manner. This step is preferably continued until a point is reached when the potassium chlorid and the borax begin to precipitate with the salts precipitated by evaporation.

If at this point an objectionable amount of carbonates is present in the brine, I bring it a second time into intimate contact with carbon dioxid, as in the initial step of the process, and thus remove practically all of the carbonates. The salts then remaining in the solution are potassium chlorid mixed with borax. This residue is mixed with the potassium chlorid and borax obtained in the earlier stage of the process, as described above.

The solution is then mixed with hot water and raised to a temperature of approximately 200° F. until it forms a more or less dilute solution. I find that a solution of the specific gravity of from 1.12 to 1.22 answers very well for this purpose. I then cool the solution to about 40° F., at which temperature part of the borax is precipitated, and when separated is of a sufficient degree of purity to be marketable after the usual washing and cleansing.

I next evaporate sufficient water from the filtrate to bring it substantially to the point of saturation, the temperature having been raised to about 200° F., and upon cooling the saturated solution to about 40° F. potassium chlorid of a marketable degree of purity is precipitated from the solution, and may be separated from it in any suitable manner. I do not wish to limit myself to the temperatures and specific gravities specified above, as they may be varied within comparatively wide ranges.

The residue may then be heated, diluted and cooled, and then concentrated by evaporation and heating, and alternate crops of borax and potassium chlorid removed, or preferably, after the first or second crop of potassium chlorid has been filtered off, may be treated to remove the other salts, as described in the earlier stages of the process, the evaporating and heating and cooling being performed as described, in this manner avoiding substantially all waste of potassium chlorid, sufficiently large batches of the solution being manipulated to secure economy in operation.

It is obvious that many changes may be made in the manner of reduction and in the order in which the various steps are performed, without departing from my invention. For instance, after the second evaporation, another cooling step may be introduced, thus precipitating a second mixed crop of borax and potassium chlorid, and in like manner further evaporating and cooling steps may be introduced.

What I claim is:

1. The process of separating potassium chlorid from a mixture of sodium and potassium salts containing potassium chlorid, sodium chlorid, borax and sodium monocarbonate, in a solution which consists in bringing the solution into intimate contact with carbon dioxid to eliminate the carbonate, evaporating the filtrate to remove sodium chlorid, then cooling the solution to separate borax and potassium chlorid, dissolving the precipitated borax and potassium chlorid to form a dilute solution having a specific gravity of from 1.12 to 1.22 at about 200° F., cooling to remove borax from the borax and potassium chlorid solution, then concentrating and cooling to remove potassium chlorid.

2. The process of separating potassium chlorid from a mixture of sodium and potassium salts containing potassium chlorid, sodium chlorid, borax and sodium monocarbonate, which consists in bringing the solution into intimate contact with carbon dioxid, removing the carbonate, evaporating to remove sodium chlorid, cooling the filtrate to separate borax and potassium chlorid, then evaporating to remove sodium sulfate and sodium chlorid, adding the borax and potassium chlorid obtained above to the solution from which the sodium sulfate and sodium chlorid have been removed to produce a solution having a specific gravity of from 1.12 to 1.22 at about 200° F., cooling to remove borax, and concentrating and cooling to remove potassium chlorid.

3. The process of separating potassium chlorid from a mixture of sodium and potassium salts containing potassium chlorid, sodium chlorid, borax and sodium monocarbonate, in solution which consists in bringing the solution into intimate contact with carbon dioxid, removing the carbonate, evaporating the filtrate to remove sodium chlorid, cooling and diluting the solution and precipitating borax and potassium chlorid, and then by successive evaporations and coolings removing sodium chlorid and sodium sulfate as a result of the evaporations and borax and potassium chlorid as a result of the cooling, and separating the borax and potassium chlorid by dissolving to form a solution having a specific gravity of from 1.12 to 1.22 at about 200° F., cooling to precipitate borax, separating the borax from the residual solution, and then concentrating the liquid residue and cooling the same to precipitate potassium chlorid.

JOHN W. HORNSEY.